US008033723B2

(12) United States Patent
Maeno et al.

(10) Patent No.: US 8,033,723 B2
(45) Date of Patent: Oct. 11, 2011

(54) SECURING STRUCTURE OF SENSOR ELEMENT HAVING LEAD AND SECURING UNIT THEREOF

(75) Inventors: Kensuke Maeno, Saitama (JP); Masatoshi Hasu, Saitama (JP); Koutarou Suzuki, Saitama (JP); Ryo Nakatsu, Saitama (JP)

(73) Assignee: Tamura Corporation, Tokyo (JP)

( * ) Notice: Subject to any disclaimer, the term of this patent is extended or adjusted under 35 U.S.C. 154(b) by 348 days.

(21) Appl. No.: 12/453,143

(22) Filed: Apr. 30, 2009

(65) Prior Publication Data

US 2010/0226410 A1 Sep. 9, 2010

(30) Foreign Application Priority Data

Mar. 5, 2009 (JP) ................................ 2009-051748

(51) Int. Cl.
*G01K 1/14* (2006.01)
*G01K 7/22* (2006.01)
*H01F 37/00* (2006.01)

(52) U.S. Cl. ... 374/208; 374/141; 374/185; 374/E7.028; 374/E1.001; 338/22 R; 338/28

(58) Field of Classification Search .................. 374/141, 374/152, 163, 172, 185, 208, 209, E7.028, 374/E7.029, E7.031, E1.001, E1.018; 73/866.5
See application file for complete search history.

(56) References Cited

U.S. PATENT DOCUMENTS 4,318,073 A * 3/1982 Rossler et al. .................. 338/28
4,449,035 A * 5/1984 Schwob ......................... 219/251
5,936,511 A * 8/1999 Kawamoto et al. .......... 338/22 R
7,043,993 B2 * 5/2006 Hayashi et al. ................. 73/708
7,193,498 B2 * 3/2007 Kawamoto et al. .......... 338/22 R
7,465,088 B2 * 12/2008 Garcia et al. .................. 374/153
2009/0027151 A1 * 1/2009 Nakatsu et al. ............... 336/212
2009/0316752 A1 * 12/2009 Kawase et al. ................ 374/183
2010/0026434 A1 * 2/2010 Okamoto et al. ............... 336/65

FOREIGN PATENT DOCUMENTS

JP 2003-124039 4/2003

* cited by examiner

*Primary Examiner* — Amy Cohen Johnson
(74) *Attorney, Agent, or Firm* — McGinn IP Law Group, PLLC

(57) ABSTRACT

A securing structure for securing a measuring member having a sensor element and a lead elongated from the sensor element to a subject to be measured, the securing structure includes the measuring member including a measuring section having a covered portion in which a part of the lead elongated from the sensor element and having a predetermined length is covered by a material having a rigidity larger than that of the lead, the covered portion being folded toward the side of the lead elongated from the covered portion to produce a folded end portion; and the subject to be measured having an insertion section through which the measuring section is inserted from the side of the folded end portion, a container section which contains the measuring section inserted through the insertion section, and a contact section with which the head portion of the covered portion comes into contact and by which the measuring section is prevented from falling out, when the lead is pulled.

12 Claims, 11 Drawing Sheets

10

SECURING STRUCTURE OF SENSOR ELEMENT HAVING LEAD AND SECURING UNIT THEREOF

BACKGROUND OF THE INVENTION

The present invention relates to a securing structure and a securing unit for securing a measuring member, which has a sensor element and a lead elongated from the sensor element, to a subject to be measured, in particular to a securing structure and a securing unit suitable for securing a thermistor to a reactor.

In general, a reactor has, for example, a winding and a core made of a magnetic substance and the winding is wound around the core to make up the coil of the reactor, which enables inductance to be obtained. Conventionally, the reactor is used in a voltage boosting circuit, inverter circuit, active filter circuit, or the like, and, in many cases, such the reactor has a structure in which the core and the coil wound around the core are housed, together with other insulating members or the like in a case made of metal or the like. Japanese Patent Application Laid-open No. 2003-124039 discloses an example of such a reactor.

For a reactor to be used in a vehicle-mounted voltage boosting circuit, a coil is used which has a structure in which two single-coil elements each having a predetermined winding diameter and the number of windings that can provide a high inductance value in a high current region are formed in parallel to each other and are coupled (connected) to each other so that the directions of currents flowing through both the coils are reversed to one another. If high current has been continuously applied to a reactor thus mentioned, the coil comes to be overheated and an electric characteristic of the reactor is thereby deteriorated. Under the circumstances, an internal temperature of the reactor is measured using a sensor such as a thermistor, or the like. The reactor is thereby controlled so as to prevent the coil from generating heat up to a certain temperature or a higher temperatures thereof. Namely, the measuring member, which has the sensor element and the lead elongated from the sensor element, is secured within the reactor in order that the sensor element, such as a thermistor, or the like, may be positioned at a measured point near the coil within the reactor, that is the subject member to be measured. Thereby, the internal temperature of the reactor is measured, so that a current flowing in the reactor is controlled to prevent the coil from generating heat up to the certain temperature or the higher temperatures thereof.

In order to stably fabricate reactors having the sensor elements, such as thermistors, or the like each capable of measuring temperature with high precision, it is necessary that the sensor elements are positioned at the same points within the reactors, respectively. However, it is almost impossible that the sensor element connected to a head portion of a lead is directly secured at the measured point within each reactor. Therefore, another portion of the lead other than the head portion thereof is secured at a portion of a reactor case with a screw. Under the circumstances, it is difficult that the sensor elements are precisely positioned at the same points within the reactors, respectively. Further, it becomes necessary to provide a securing structure with the screw in the another portion of the lead other than the head portion thereof. This causes a much cost up of members for measuring temperature of the reactor.

However, in fact, no effective proposal has been made about a technique for precisely positioning and securing the sensor element connected to the head portion of the lead within the reactor in spite of a compact configuration by the no use of the securing structure with the screw thus mentioned.

Accordingly, it is desired to develop a non-complicated and effective securing structure suitable for various subjects to be measured. In particular, it is strongly desired to develop such a non-complicated and effective securing structure suitable for a compact and thin-sized reactor that has come to be often used in a reactor mounted on an automobile in recent years.

SUMMARY OF THE INVENTION

It is therefore an object of the present invention to provide a securing structure and a securing unit for precisely positioning and securing a measuring member having a sensor element and a lead elongated from the sensor element to a subject to be measured.

It is yet another object of the present invention to provide a non-complicated securing structure which is capable of not only being readily designed and readily attached to a compact and thin-sized reactor but also being fabricated at a low cost and which is further capable of precisely positioning and securing a measuring member having a sensor element and a lead elongated from the sensor element to the compact and thin-sized reactor, when particularly applied to the compact and thin-sized reactor as a subject to be measured.

In order to stably fabricate a subject to be measured having the sensor element and a lead elongated from the sensor element capable of measuring temperature with high precision, the inventors of the present invention have newly invented a securing structure and a securing unit capable of precisely positioning and securing a non-complicated measuring member having a sensor element and a lead elongated from the sensor element to the same positions of a subject to be measured every time.

According to an aspect of the present invention, there is provided a securing structure for securing a measuring member having a sensor element and a lead elongated from the sensor element to a subject to be measured, the securing structure comprising;

the measuring member including a measuring section having a covered portion in which a part of the lead elongated from the sensor element and having a predetermined length is covered by a material having a rigidity larger than that of the lead, the covered portion being folded toward the side of the lead elongated from the covered portion to produce a folded end portion; and the subject to be measured having an insertion section through which the measuring section is inserted from the side of the folded end portion, a container section which contains the measuring section inserted through the insertion section, and a contact section with which the head portion of the covered portion comes into contact and by which the measuring section is prevented from falling out, when the lead is pulled.

With the structure, the part of the lead is covered to form the covered portion and the covered portion is folded to form the measuring section, so that the measuring member becomes non-complicated. Further, the covered portion of the measuring section once contained in the container section comes into contact with the contact section and is made of a material having a rigidity larger than that of the lead, so that the covered portion of the measuring section is not easily deformed. The measuring section including the covered portion can therefore be prevented from falling out of the container section. Moreover, the sensor element of the measuring section contained in the container section is always positioned at the same positions of the subject to be measured. This enables measurement with high precision.

Further, the contact section is formed in the insertion section. Consequently, it is possible to design, at the same time, the insertion section through which the measuring section can be readily inserted and the contact section with which the covered portion can come into contact firmly.

Furthermore, a size of an inlet of each of the insertion section and the container section is formed to be approximately the same as a size of the measuring section in the direction perpendicular to an axis thereof. As a result, the measuring section once contained in the container section through the insertion section can be held firmly.

Moreover, a depth of the container section is formed to be approximately the same as a size of the measuring section in an axial direction thereof. As a result, the measuring section once contained in the container section can come into contact with the contact section firmly and thereby be prevented from falling out of the container section.

In addition, a size of the measuring section in an axial direction thereof is formed to be larger than that of the measuring section in the direction perpendicular to an axis thereof. As a result, even if the lead is pulled, the measuring section never be rotated inside the container section and thereby can be prevented from falling out of the container section.

Further, the lead is made of a material having elasticity. Accordingly, even if a size of an inlet of the container section is formed to be larger than a size of the measuring section in the direction perpendicular to an axis thereof, the covered portion becomes opened around the folded end portion. The head portion of the covered portion thereby comes into contact with the contact section firmly, so that the measuring section can be prevented from falling out of the container section.

According to another aspect of the present invention, there is also provided a securing unit which is secured to a subject to be measured, the securing unit comprising:

a measuring member having a sensor element and a lead elongated from the sensor element;

a housing member having an insertion section through which the sensor element and the lead are inserted, a container section which contains the sensor element and the lead inserted through the insertion section, and a contact section with which the sensor element and the lead comes into contact and by which the sensor element and the lead are prevented from falling out, when the lead is pulled; and the measuring member being fixed within the housing member.

With the structure, the sensor element and the lead elongated from the sensor element can be integrally a package as the securing unit having the measuring member. The securing unit can thereby be commonly used for various subjects to be measured.

According to yet another aspect of the present invention, there is further provided a securing structure for securing a measuring member having a sensor element and a lead elongated from the sensor element to a subject to be measured, the securing structure comprising:

the measuring member including a measuring section having a covered portion in which a part of the lead elongated from the sensor element and having a predetermined length is covered by a material having a rigidity larger than that of the lead, the covered portion being folded toward the side of the lead elongated from the covered portion to produce a folded end portion; and the subject to be measured being constituted by at least first and second members, the first and second members forming an insertion section through which the measuring section is inserted from the side of the folded end portion, a container section which contains the measuring section inserted through the insertion section, and a falling out-preventing section with which the head portion of the covered portion comes into contact and by which the measuring section is prevented from falling out, when the lead is pulled; and the container section being configured by a space formed obliquely between the first and the second members while the falling out-preventing section being configured in one of the first and the second members positioned below the space.

With the structure, the part of the lead is covered to form the covered portion and the covered portion is folded to form the measuring section, so that the measuring member becomes non-complicated. Further, the covered portion of the measuring section once contained in the container section is prevented from falling out by the falling out-preventing section, when the lead is pulled, and is made of a material having a rigidity larger than that of the lead, so that the covered portion of the measuring section is not easily deformed. The measuring section including the covered portion can therefore be prevented from falling out of the container section. Moreover, the sensor element of the measuring section contained in the container section is always positioned at the same positions of the subject to be measured. This enables measurement with high precision.

Furthermore, with the structure, the container section is configured by a space formed obliquely between the first and the second members while the falling out-preventing section is configured in one of the first and the second members positioned below the obliquely formed space. As a result, even if the subject to be measured is compact and thin-sized and so a space for distributing the measuring member cannot be sufficiently obtained, the securing structure can be far readily attached to the compact and thin-sized subject to be measured. In addition, even if the subject to be measured is compact and thin-sized and then the container section is located not so obliquely but almost horizontally, the measuring member can be readily inserted into the container section and thereby be readily attached to the compact and thin-sized subject to be measured.

Thus, even if the subject to be measured is compact and thin-sized and so a space for distributing the measuring member cannot be sufficiently obtained, the securing structure is capable not only of making the measuring member be attached to the compact and thin-sized subject to be measured stably but also of reducing design processes thereof Besides, the measuring member is desirably inserted into the container section through the insertion section in a condition that the covered portion is directed downward with respect to the lead elongated from the covered portion.

Further, the falling out-preventing section is preferably constituted by a hall-shaped hook portion into which the head portion of the covered portion enters and with which the head portion of the covered portion comes into contact.

Furthermore, the hall-shaped hook portion is preferably formed below and near the insertion section.

Moreover, the lead is desirably made of a material having elasticity.

DETAILED DESCRIPTION OF THE PREFERRED EMBODIMENTS

Now, referring to FIGS. 1 through 7, description is made about a securing structure for securing a measuring member having a sensor element and a lead elongated from the sensor element to a subject to be measured according to a first embodiment of the present invention. In this embodiment, the present invention is applied to a case that a thermistor, as a measuring member, is secured to a reactor, as a subject to be measured.

Figure 1:
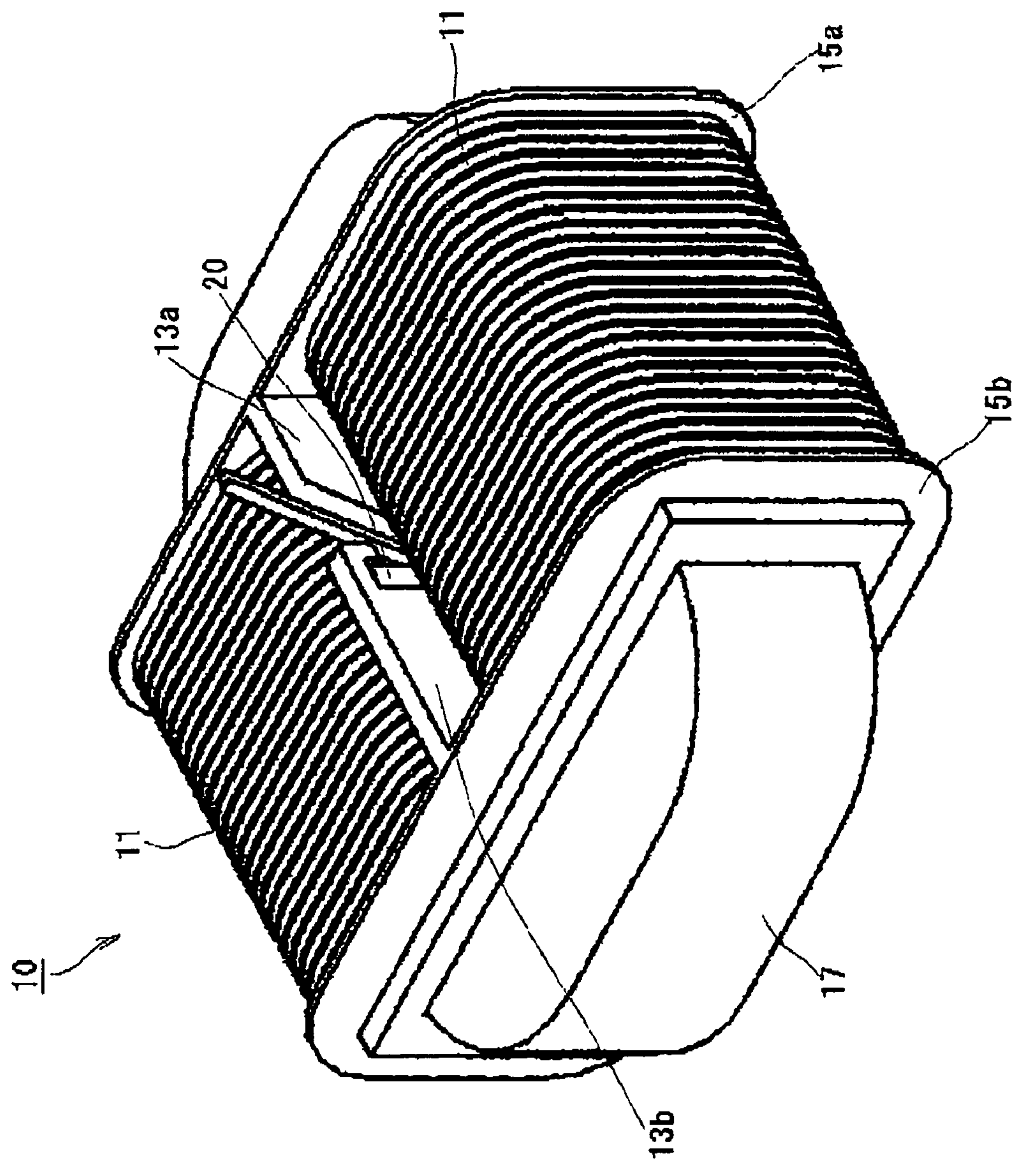
FIG. 1 is a perspective view for schematically showing a reactor to which a securing structure according to a first embodiment of the present invention is applied.
Figure 2:
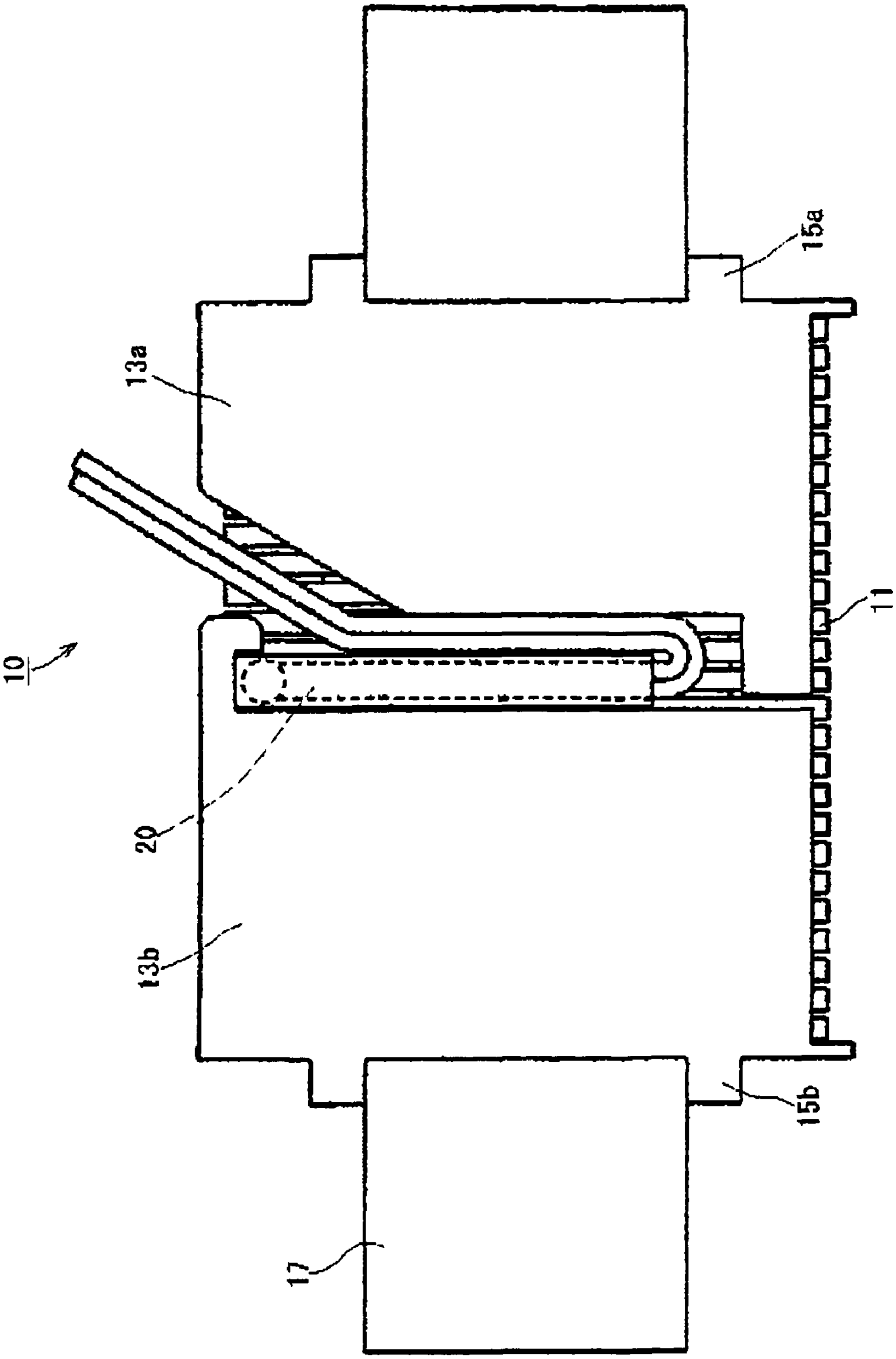
FIG. 2 is a cross sectional view for schematically showing the reactor illustrated in FIG. 1 at a distribution plate of the reactor.

FIG. 1 is a perspective view for schematically showing a reactor to which a securing structure according to the first embodiment of the present invention is applied. FIG. 2 is a cross sectional view for schematically showing the reactor illustrated in FIG. 1 at a distribution plate of the reactor.

Figure 4:
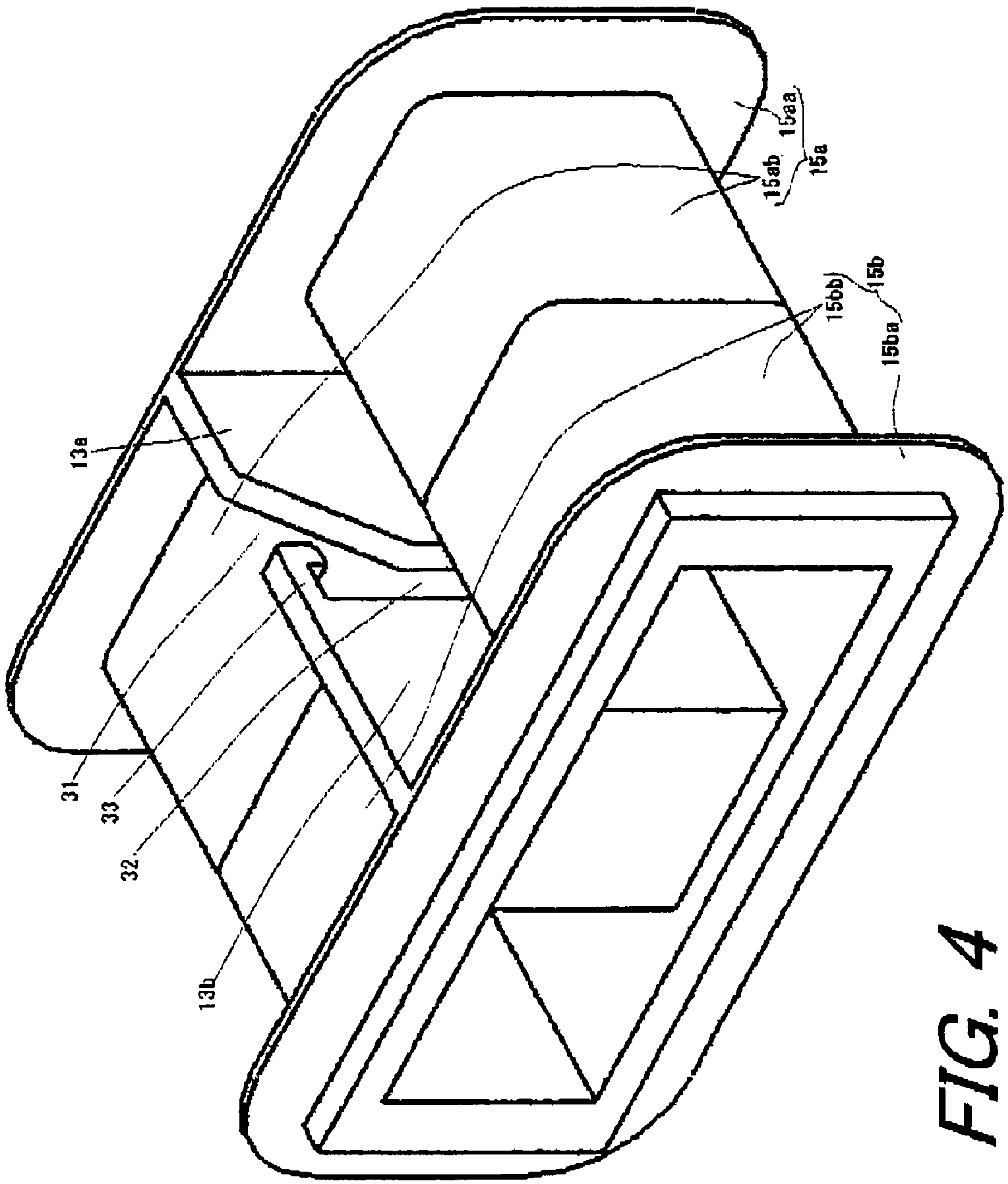
FIG. 4 is a perspective view for schematically showing only a bobbin and a coil distribution plate illustrated in FIG. 1.

The reactor 10 is such a reactor used in an electric circuit of an apparatus having compulsory cooling means. As illustrated in FIG. 1, the reactor 10 includes a reactor coil 11, bobbins 15*a* and 15*b* having coil distribution plates 13*a* and 13*b* formed integrally with the bobbins 15*a* and 15*b*, a reactor core 17, a thermistor 20, an unillustrated heat-conductive reactor case, an insulative and heat-radiative sheet, and the like. The reactor coil 11 has a constitution that two single coil elements are formed in parallel. As illustrated in FIG. 4, the bobbins 15*a* and 15*b* has flange portions 15*aa*, 15*ba* and two boss portions 15*ab*, 15*bb* formed integrally with the flange portions 15*aa*, 15*ba*, respectively. The bobbins 15*a*, 15*b* has a constitution that respective boss portions 15*ab*, 15*bb* are disposed to be opposite to each other. The coil distribution plates 13*a* and 13*b* are disposed between the two boss portions 15*ab* and 15*bb* in the bobbins 15*a* and 15*b*, so that the coil distribution plates 13*a*, 13*b* are constructed to be integral with the flange portions 15*aa*, 15*ba*, respectively. The reactor core 17 is formed to be approximately oval when viewed from the above. The reactor core 17 is thereby configured to be capable of being inserted into the reactor coil 11.

In the reactor 10, the two boss portions 15*ab* and 15*bb* in the bobbins 15*a* and 15*b* are inserted into the two single coil elements of the reactor coil 11 while the coil distribution plates 13*a*, 13*b* are inserted between the two single coil elements of the reactor coil 11. Further, both ends of the reactor coil 11 are held by the two flange portions 15*aa* and 15*ba* in the bobbins 15*a* and 15*b*. In addition, the reactor core 17 is inserted into the two boss portions 15*ab* and 15*bb* in the bobbins 15*a* and 15*b* while the thermistor 20 is secured to the coil distribution plates 13*a* and 13*b*. Then, these parts are contained in the heat-conductive reactor case through the insulative and heat-radiative sheet. Further, filler is flown into the heat-conductive reactor case, so that the parts are constructed to be fixed within the heat-conductive reactor case.

With the construction, the coil distribution plates 13*a* and 13*b* as well as the thermistor 20 constitute features of the securing structure of the present invention and are hereunder described in detail with reference to FIGS. 3 through 7.

Figure 3:
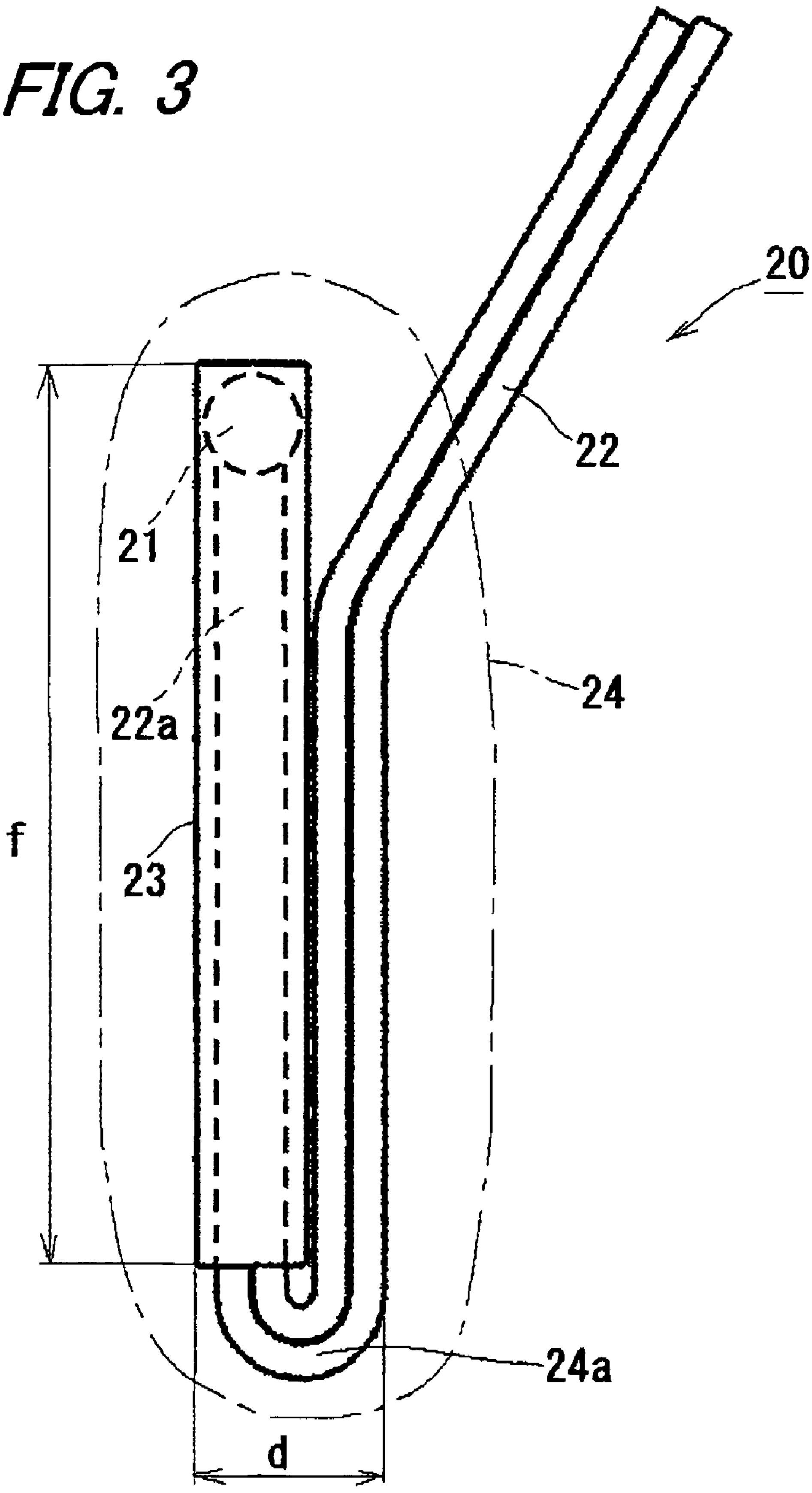
FIG. 3 is a view for schematically showing a thermistor illustrated in FIG. 1 as a single unit.
Figure 5:
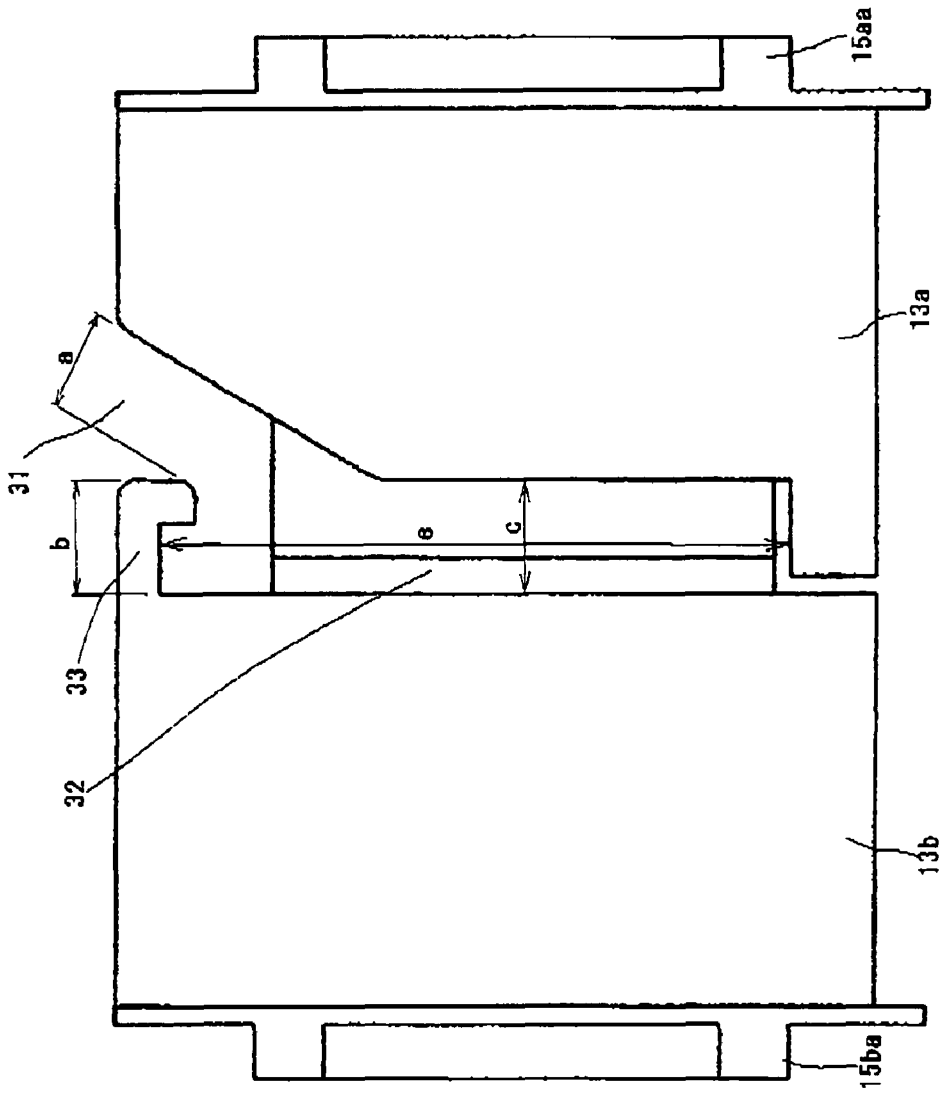
FIG. 5 is a cross sectional view for schematically showing the coil distribution plate illustrated in FIG. 4.

FIG. 3 is a view for schematically showing the thermistor 20 illustrated in FIG. 1 as a single unit. FIG. 4 is a perspective view for schematically showing only the bobbins 15*a* and 15*b* and the coil distribution plates 13*a* and 13*b* illustrated in FIG. 1. FIG. 5 is a cross sectional view for schematically showing the coil distribution plates 13*a* and 13*b* illustrated in FIG. 4. The thermistor 20 has a thermistor element 21 and a lead 22 elongated from the thermistor element 21, as illustrated in FIG. 3. Further, a part of the lead 22*a* having a predetermined length elongated from the thermistor element 21 shown by a broken line in FIG. 3 is covered by a resin tube 23. Then, the covered portion including the thermistor element 21 and the part of the lead 22*a* covered by the resin tube 23 is folded toward the side of the lead 22 elongated from the covered portion (the resin tube 23) by an angle of 180° to produce a folded end portion 24*a* having a shape like a hair pin. A measuring section 24 surrounded by alternate long and short dotted lines is thereby formed as shown in FIG. 3. Since the folded end portion 24*a* of the measuring section 24 is formed like a hair pin shape having no edge portion, the folded end portion 24*a* is not easily disconnected but readily invited into the insertion section 31 and readily inserted into the container section 82. The measuring section 24 thus constitutes a part of the securing structure of the present invention.

As illustrated in FIGS. 4 and 5, the insertion section 31, the container section 32 and a contact section 33 are disposed in the coil distribution plates 13*a* and 13*b*. The measuring section 24 is inserted into the container section 32 through the insertion section 31 from the side of the folded end portion 24*a*. The measuring section 24 inserted through the insertion section 31 is then contained in the container section 32. The head portion of the covered portion (resin tube 23) comes into contact with the contact section 33 and the measuring section 24 is thereby prevented from falling out, when the lead 22 is pulled. The insertion section 31, the container section 32 and the contact section 33 thus constitute a part of the securing structure of the present invention.

The insertion section 31 is formed in a left and upper end portion of the coil distribution plate 13*a*, as illustrated in FIG. 5. In other words, the left and upper end portion of the coil distribution plate 13*a* is notched to have a notched portion of a triangle shape that forms the insertion section 31. The container section 32 is formed between a left hand portion, a left and lower end portion of the coil distribution plate 13*a* and a right hand portion of the coil distribution plate 13*b*. In other words, the left hand portion of the coil distribution plate 13*a* is notched to have a notched portion of a rectangular shape. Further, the notched portion of a rectangular shape as well as a portion surrounded by the right hand portion of the coil distribution plate 13*b* forms the container section 32. The contact section 33 is formed in a right and upper end portion of the coil distribution plate 13*b*. In other words, the right and upper end portion of the coil distribution plate 13*b* is projected to have a projecting portion of a nail shape elongating toward the right hand of sheet of FIG. 5. The projecting portion of a nail shape thereby forms the contact section 33.

The insertion section 31 and the contact section 33 are formed in the left and upper end portion of the coil distribution plate 13*a* and the right and upper end portion of the coil distribution plate 13*b,* respectively, as illustrated in FIG. 5. As a result, it becomes possible to design, at the same time, the insertion section 31 through which the measuring section 24 capable of being readily inserted and the contact section 33 with which the head portion of the covered portion (resin tube 23) capable of firmly coming into contact, by adjusting a size a of an inlet of the insertion section 31 (a distance a between a head of the contact section 33 and the left and upper end portion of the coil distribution plate 13*a*) and a length b of the projecting portion of the contact section 33.

Further, the size a of the inlet of the insertion section 31 and a size c of an inlet of the container section 32 (a distance c between the left hand portion of the coil distribution plate 13*a* and the right hand portion of the coil distribution plate 13*b*) is formed to be approximately the same as a size d (see FIG. 3) of the measuring section 24 in the direction perpendicular to an axis of the measuring section 24. As a result, the measuring section 24 once contained in the container section 32 through the insertion section 31 is sandwiched by both the left hand portion of the coil distribution plate 13*a* and the right hand portion of the coil distribution plate 13*b* in the direction perpendicular to the axis of the measuring section 24. The measuring section 24 contained in the container section 32 can thereby be held firmly.

Moreover, a depth e of the container section 32 (a distance e between a lower end of the contact section 33 and the left and lower end portion of the coil distribution plate 13*a*) is formed to be approximately the same as a size f (see FIG. 3) of the measuring section 24 in an axial direction of the measuring section 24. As a result, the measuring section 24 once contained in the container section 32 is restricted to move in the above axial direction thereof by the contact section 33 and the left and lower end portion of the coil distribution plate 13*a*. The head portion of the covered portion resin tube 23) comes into contact with the contact section 33 firmly. The measuring section 24 is thereby prevented from falling out of the container section 32.

In addition, the size f of the measuring section 24 in the axial direction thereof is formed to be larger than a size d of the measuring section 24 in the direction perpendicular to the axis thereof. On the contrary, if the size f of the measuring section 24 in the axial direction thereof were smaller than the size d of the measuring section 24 in the direction perpendicular to the axis thereof, the following situation would be concerned. Namely, when the lead 22 is pulled, the measuring section 24 would be rotated counter-clockwise inside the container section 32 around the head portion of the covered portion (resin tube 23) kept in contact with the contact section 33 as a fulcrum. As a result, the measuring section 24 would fall out of the container section 32. However, in this embodiment, the size f of the measuring section 24 in the axial direction thereof is formed to be larger than the size d of the measuring section 24 in the direction perpendicular to the axis thereof. Consequently, when the lead 22 is pulled, the measuring section 24 is kept contact with inner walls of the container section 32 consisting mainly of the left hand portion of the coil distribution plate 13*a* and the right hand portion of the coil distribution plate 13*b,* so that the measuring section 24 is not rotated inside the container section 32. The measuring section 24 can thereby be prevented from falling out of the container section 32.

Further, if the resin tube 23 is made of a material of softness, it is concerned that the resin tube 23 is folded to fall out of the container section 32, when the lead 22 is pulled. Accordingly, it is necessary that the resin tube 23 is made of a material having rigidity at least larger than that of the lead 22. Moreover, it is also necessary that the thermistor element 21 is insulated and protected by the resin tube 23. In addition, it is also necessary that the resin tube 23 is made of a material capable of readily sliding, in order that the resin tube 23 may be readily inserted from the insertion section 31 into the container section 32. In view of the above, it is desirable that the resin tube 23 is made, for example, of fluorocarbon polymers.

In the embodiment described above, the size c of the inlet of the container section 32 is formed to be approximately the same as the size d of the measuring section 24 in the direction perpendicular to the axis of the measuring section 24. However, the size c of the inlet of the container section 32 may alternatively be formed to be larger than the size d of the measuring section 24 in the direction perpendicular to the axis of the measuring section 24. In this case, it is necessary that the lead 22 is made of a material having elasticity. Thereby, even if the size c of the inlet of the container section 32 is larger than the size d of the measuring section 24 in the direction perpendicular to the axis thereof, the measuring section 24 becomes opened around the folded end portion 24*a* until the resin tube 23 comes into contact with the right hand portion of the coil distribution plate 13*b*. Consequently, the head portion of the resin tube 23 (covered portion) thereby comes into contact with the contact section 33 firmly, so that the measuring section 24 can be prevented from falling out of the container section 32.

Figure 6A:
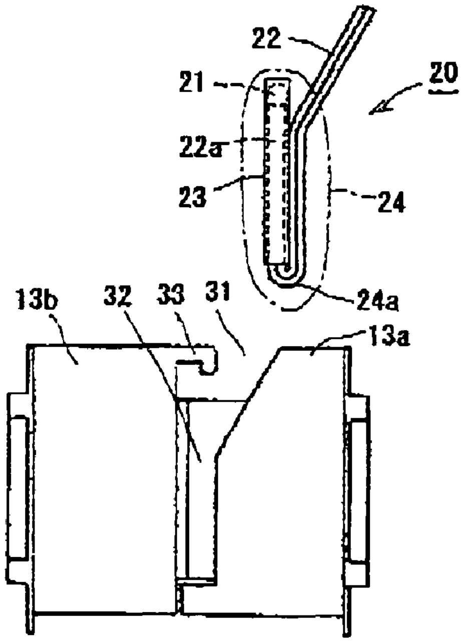
FIGS. 6A through 6C are views for schematically showing operation processes for securing the thermistor to the coil distribution plate using the securing structure according to the first embodiment of the present invention.
Figure 6B:
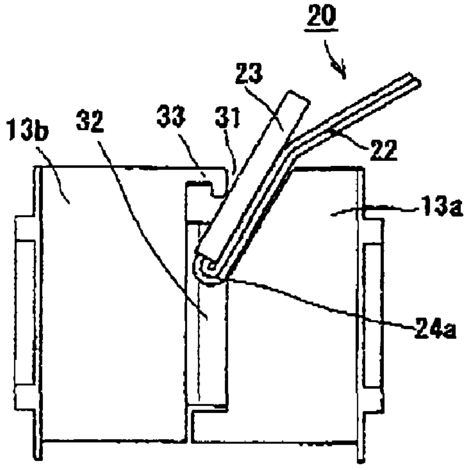
Figure 6C:
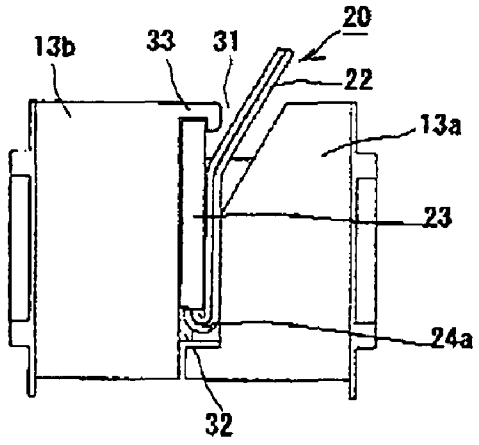

Next, referring to FIGS. 6A through 6C, description is made as regards operation processes for securing the thermistor to the coil distribution plates using the securing structure according to the first embodiment of the present invention.

First, as illustrated in FIG. 6A, the thermistor element 21 and the part of the lead 22*a* covered by the resin tube 23 is folded toward the side of the lead 22 elongated from the covered portion (the resin tube 23) by an angle of 180° to produce the measuring section 24 including a folded end portion 24*a* having a shape like a hair pin. The folded end portion 24*a* of the measuring section 24 is then directed to the insertion section 31 formed in the coil distribution plates 13*a* and 13*b*.

Thereafter, as illustrated in FIG. 6B, the measuring section 24 is inserted in the insertion section 31 from the side of the folded end portion 24*a*. Herein, the left and upper portion of the coil distribution plate 13*a* which ranges from the insertion section 31 to the container section 32 is formed to be an inclined plane. As a result, the measuring section 24 is guided by the inclined plane, so that the measuring section 24 can be slid into the container section 32 smoothly.

Finally, as illustrated in FIG. 6C, the measuring section 24 is pushed into the container section 32 until the head portion of the resin tube 23 passes the contact section 33. The measuring section 24 is thereby contained in the container section 32. Consequently, the head portion of the resin tube 23 is hooked by the contact section 33, the thermistor element 21 is fixedly positioned. Further, the head portion of the resin tube 23 is thus hooked by the contact section 33. Accordingly, even if the lead 22 is pulled, the measuring section 24 can be prevented from falling out of the container section 32.

Thus, according to the securing structure of this embodiment, it becomes unnecessary to have a process of applying an adhesive for preventing a thermistor from falling out of a reactor and a process of hardening the applied adhesive, although those processes are required in the conventional technique mentioned in the preamble of the instant specification. Accordingly, operation processes for fabricating the reactor 10 including the secured thermistor 20 can be reduced drastically. Further, unevenness due to the operation processes can also be reduced.

Figure 7:
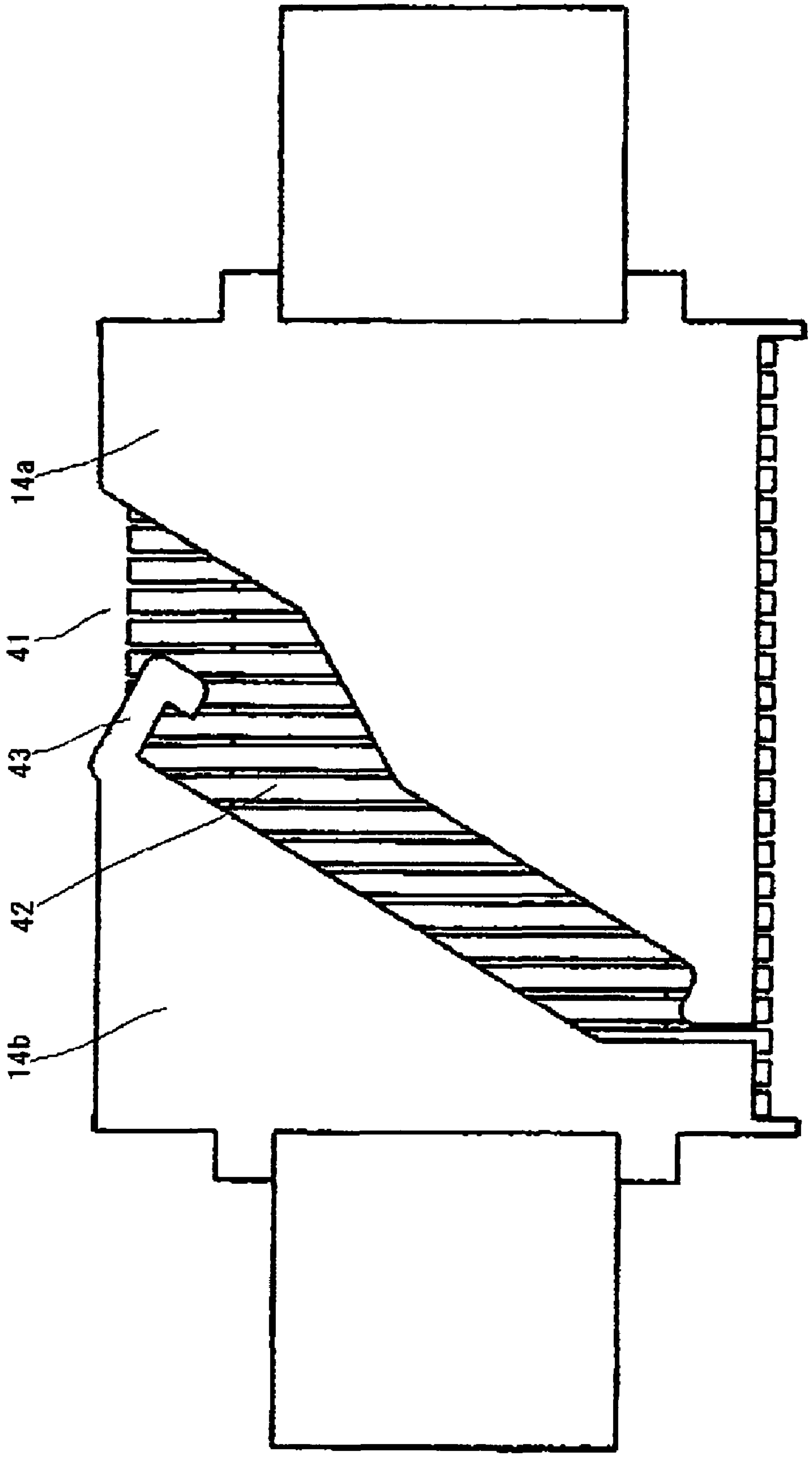
FIG. 7 is a cross sectional view for schematically showing coil distribution plates, similarly to FIG. 5, using the securing structure according to the second embodiment of the present invention.

Next, referring to FIG. 7, description proceeds to a securing structure for securing a measuring member having a sensor element and a lead elongated from the sensor element to a subject to be measured according to a second embodiment of the present invention. FIG. 7 is a cross sectional view for schematically showing, similarly to FIG. 5, a coil distribution plate using the securing structure according to the second embodiment of the present invention. In this embodiment, portions similar to those of the first embodiment are designated by like reference numerals, and then detailed explanation for those portions are omitted accordingly.

As illustrated in FIG. 7, an insertion section 41, a container section 42 and a contact section 43 are disposed in coil distribution plates 14*a* and 14*b*. The measuring section 24 is inserted into the container section 42 through the insertion section 41 from the side of the folded end portion 24*a*. The measuring section 24 inserted through the insertion section 41 is contained in the container section 42. The head portion of the covered portion (resin tube 23) comes into contact with the contact section 43 and the measuring section 24 is thereby prevented from falling out, when the lead 22 is pulled. The insertion section 41, the container section 42 and the contact section 43 constitute a part of the securing structure of this embodiment of the present invention.

In the securing structure illustrated in FIG. 7, the container section 42 and the contact section 43 have the same sizes as those of the first embodiment illustrated in FIG. 5. However, the securing structure illustrated in FIG. 7 is different from that illustrated in FIG. 5, since the container section 42 and the contact section 43 are formed obliquely. The insertion section 41 is formed in a left and upper end portion of the coil distribution plate 14*a*. In other words, the left and upper end portion of the coil distribution plate 14*a* is notched to have a notched portion of a triangle shape that forms the insertion section 41. The container section 42 is formed between a left hand portion of the coil distribution plate 14*a* and a right hand portion of the coil distribution plate 14*b*. In other words, the left hand portion of the coil distribution plate 14*a* extending to the above notched portion of a triangle shape is notched to have another notched portion of a triangle shape. Further, the right hand portion of the coil distribution plate 14*b* is also notched to have yet another notched portion of a triangle shape. A portion surrounded by these notched portions forms the container section 42. The contact section 43 is formed obliquely in a right and upper end portion of the coil distribution plate 14*b*. In other words, the right and upper end portion of the coil distribution plate 14*b* is projected to have a projecting portion of a nail shape extending toward the right and obliquely lower direction of sheet of FIG. 7. The projecting portion of a nail shape thereby forms the contact section 43.

Thus, the container section 42 and the contact section 43 are formed obliquely. As a result, the container section 42 and the contact section 43 can be formed by the same sizes as those of the container section 32 and the contact section 33 of the first embodiment, even if the securing structure is applied to a compact reactor, or a reactor of small height. Thus, according to the first and the second embodiment of the present invention, the same measuring section 24 can be used in various reactors, from a large-sized reactor to a small-sized reactor by changing angles of forming the container section 32(42) and the contact section 33(43).

Figure 8:
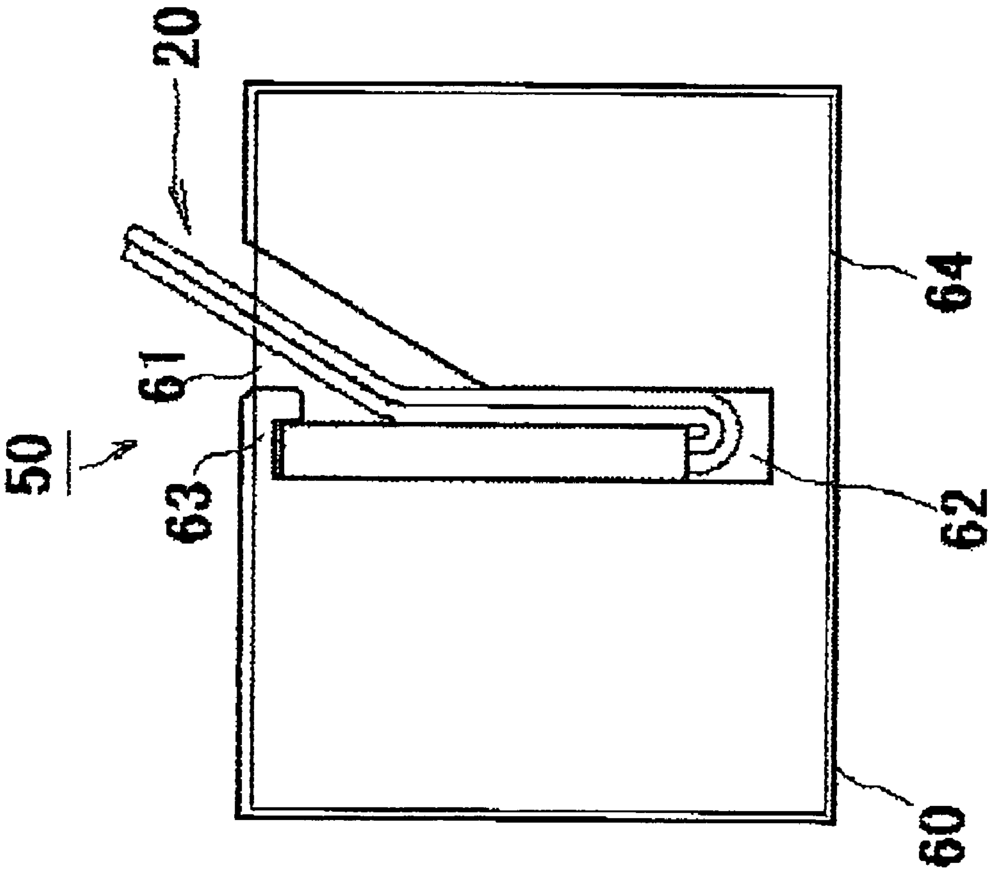
FIG. 8 is a view for schematically showing a securing unit according to a third embodiment of the present invention.

Further, referring to FIG. 8, description proceeds to a securing structure for securing a measuring member having a sensor element and a lead elongated from the sensor element to a subject to be measured according to a third embodiment of the present invention. FIG. 8 is a view for schematically showing a securing unit according to the third embodiment of the present invention. In this embodiment, portions similar to those of the first and second embodiments are designated by like reference numerals, and then detailed explanation for those portions are omitted accordingly.

In the securing structure according to the third embodiment, a securing unit 50 comprises a thermistor 20 as a measuring member having a thermistor element 21 as a sensor element and a lead 22 elongated from the thermistor element 21, a securing plate 60 as a housing member having an insertion section 61 through which the thermistor element 21 and the lead 22 are inserted, a container section 62 which contains the thermistor element 21 and the lead 22 inserted through the insertion section 61, and a contact section 63 with which the thermistor element 21 and the lead 22 come into contact and by which the thermistor element 21 and the lead 22 are prevented from falling out, when the lead 22 is pulled, and the thermistor 20 as a measuring member is fixed within the securing plate 60 as a housing member. Namely, the thermistor 20 has been previously secured in the securing plate 60 having a construction similar to that of the coil distribution plates 13*a* and 13*b* of the first embodiment to produce the securing unit 50 as a package.

As illustrated in FIG. 8, an insertion section 61, a container section 62 and a contact section 63, each of which has the same size and configuration as those of the insertion section 31, the container section 32 and the contact section 33 illustrated in FIG. 5, are formed in the securing plate 60. Accordingly, the measuring section 24 of the thermistor 20 is inserted into the container section 62 through the insertion section 61 from the side of the folded end portion 24*a*. The measuring section 24 inserted through the insertion section 61 is contained in the container section 62. The head portion of the covered portion (resin tube 23) comes into contact with the contact section 63 and the measuring section 24 is thereby prevented from falling out, when the lead 22 is pulled. However, a portion corresponding to the left and lower end portion of the coil distribution plate 13*a* illustrated in FIG. 5 is formed integrally with the container section 62. Further, a resin film 64, which is transparent, semi-transparent, or opaque, is affixed to both planes of the securing plate 60 in which the measuring section 24 is contained in order to prevent the measuring section 24 from being removed.

Thus, the thermistor 20 has been previously secured in the securing plate 60 to produce the securing unit 50 as a package. As a result, the securing unit 50 can be applied to a reactor having no securing structure consisting mainly of the above-mentioned coil distribution plates 13*a* and 13*b* of the first embodiment. Further, a subject to be measured to which the securing unit 50 can be applied is not restricted to a reactor. In other words, the securing unit 50 can be commonly used in various subjects to be measured. Besides, it is alternatively possible that the securing structure illustrated in FIG. 7 is incorporated in a securing unit as a package. Thereby, such a securing unit can be commonly used in various compact-sized subjects to be measured.

As described above, according to the securing structures of the first, the second and the third embodiments of the present invention, the part of the lead 22 is covered by the resin tube 23 to form the covered portion and the covered portion is folded to form the measuring section 24, so that the thermistor 20 as the measuring member becomes non-complicated. Further, the covered portion (the resin tube 23) of the measuring section 24 once contained in the container sections 32, 42, 62 comes into contact with the contact sections 33, 43, 63 and is made of a material having a rigidity larger than that of the lead 22, so that the covered portion (the resin tube 23) of the measuring section 24 is not easily deformed. The measuring section 24 including the covered portion (the resin tube 23) can therefore be prevented from falling out of the container sections 32, 42, 62. Moreover, the thermistor element 21 as the sensor element of the measuring section 24 contained in the container sections 32, 42, 62 is always positioned at the same positions of the reactor 10 as a subject to be measured. This enables measurement with high precision.

Figure 9:
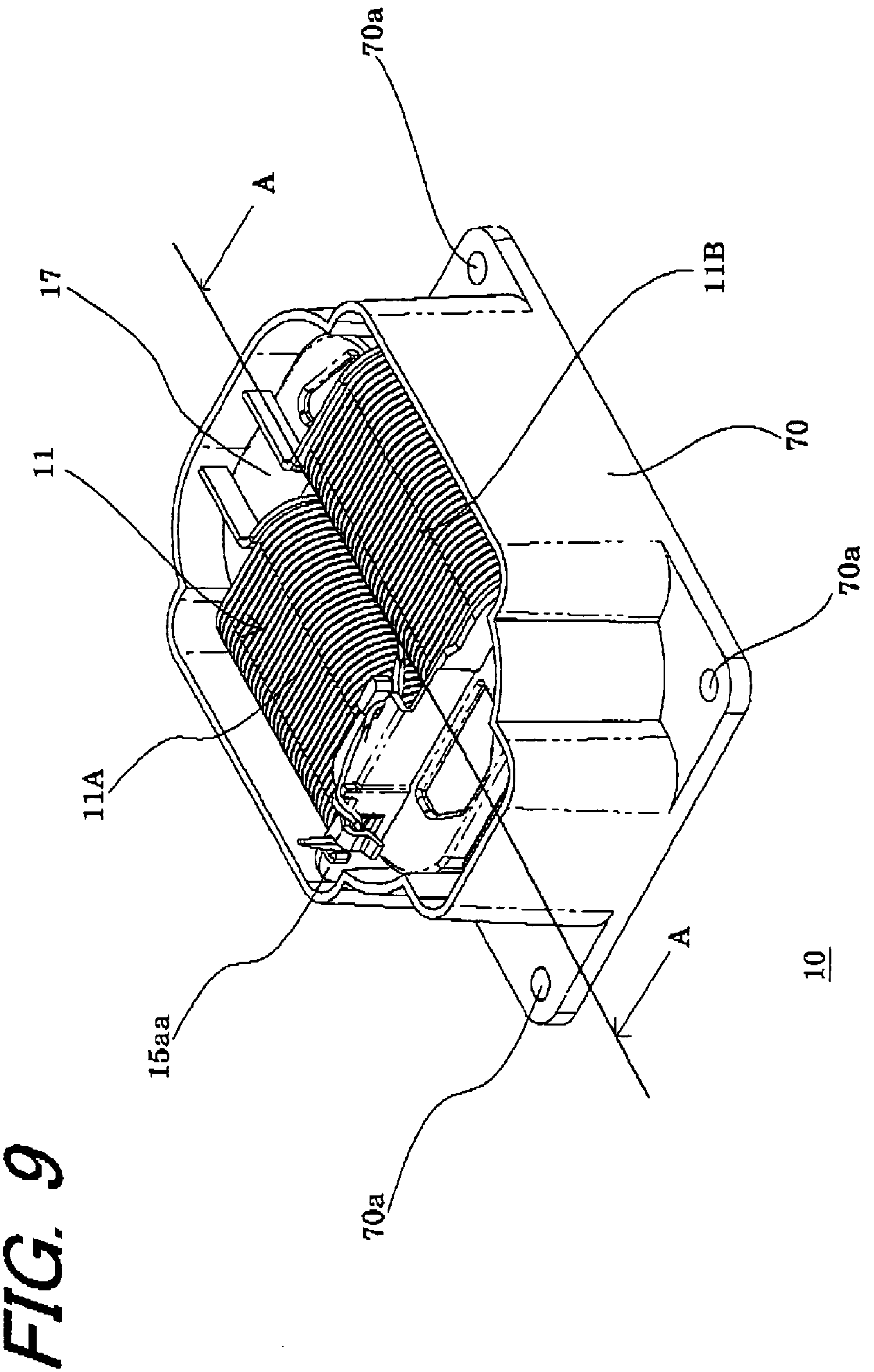
FIG. 9 is a perspective view for schematically showing a compact and thin-sized reactor to which a securing structure according to a fourth embodiment of the present invention is applied.
Figure 10:
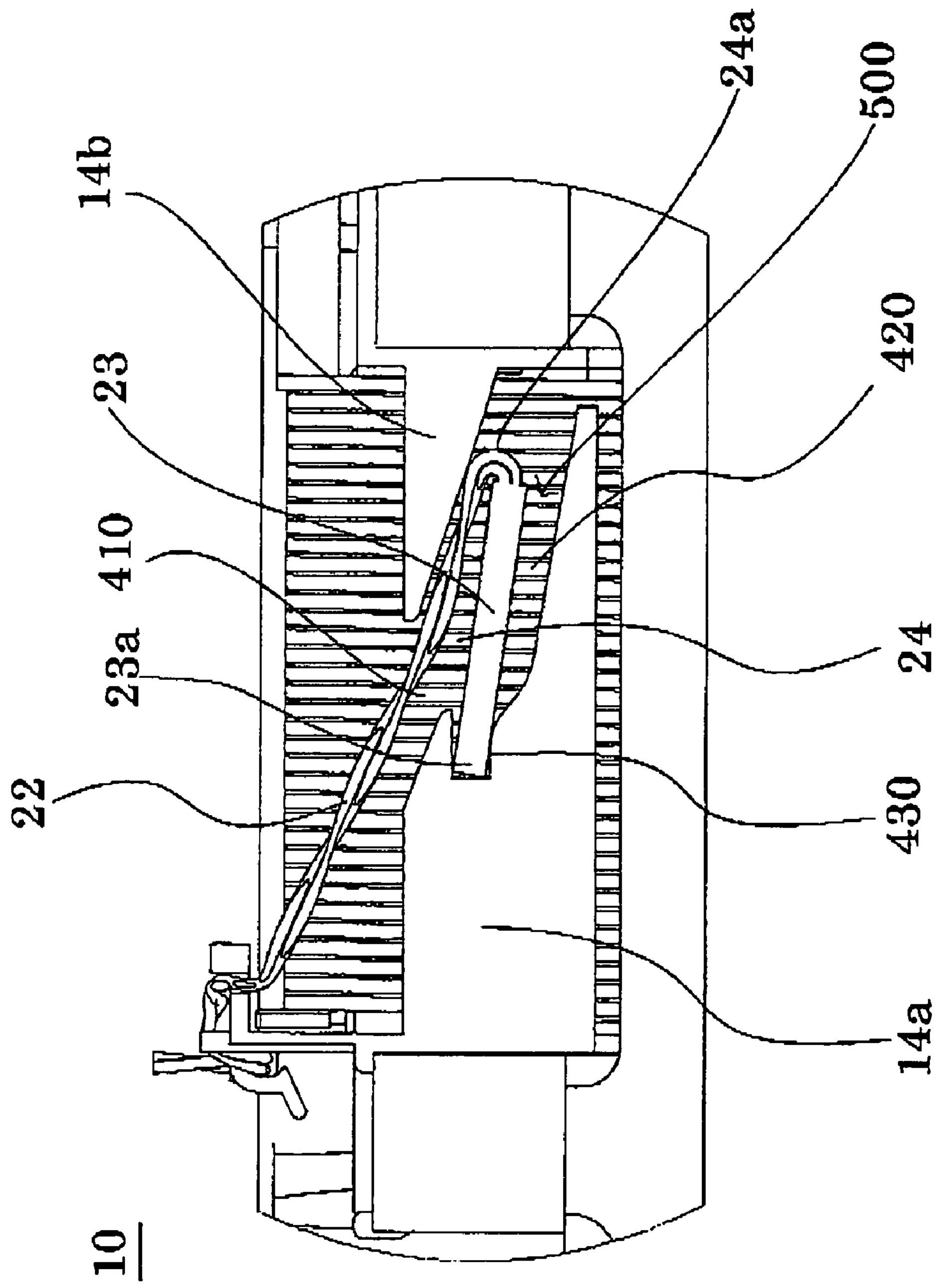
FIG. 10 is a view for schematically showing the securing structure according to the fourth embodiment of the present invention, corresponding to a cross sectional view of the compact and thin-sized reactor taken from A-A line in FIG. 9.
Figure 11:
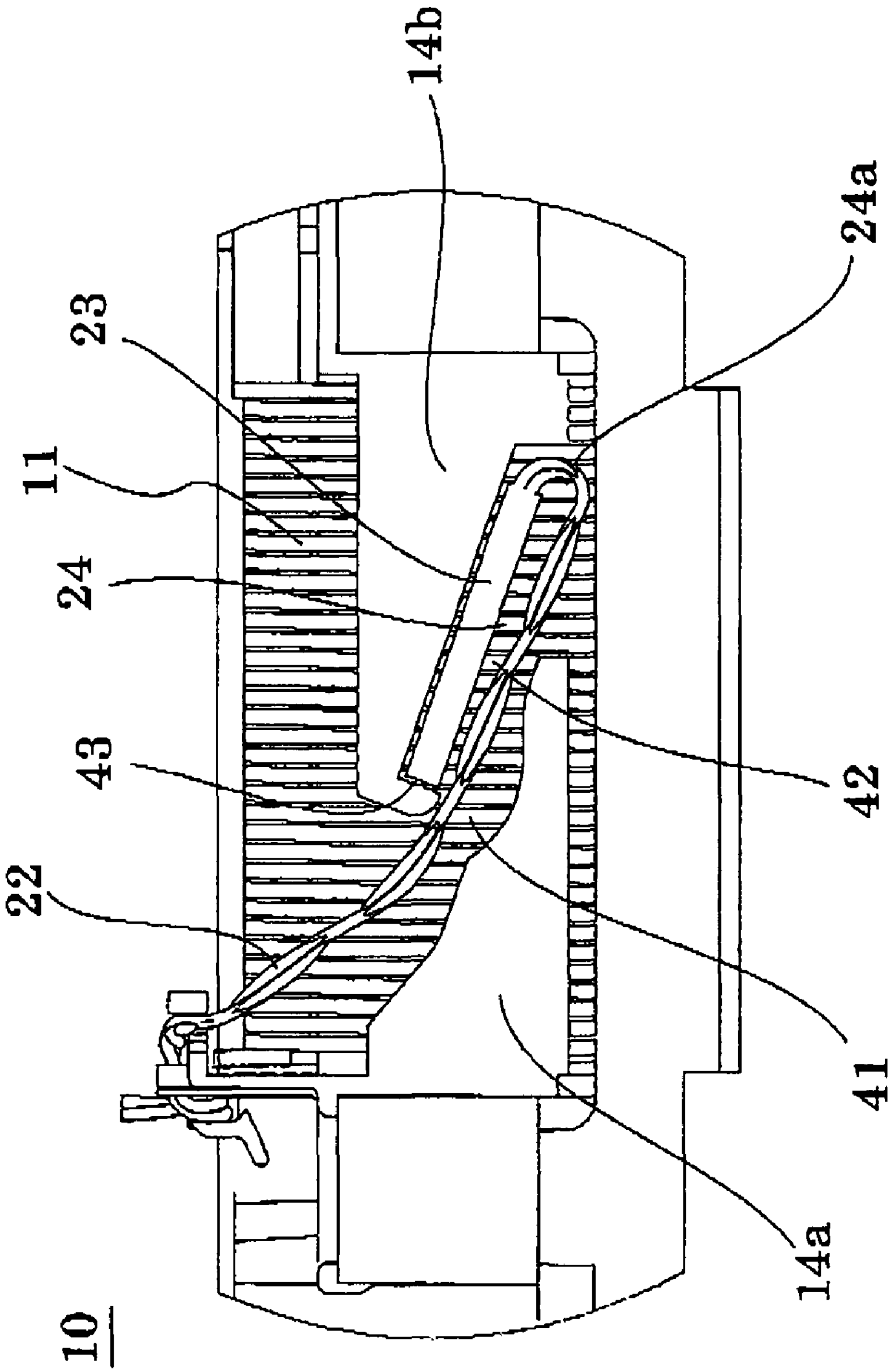
FIG. 11 is a view for schematically showing a securing structure according to a fifth embodiment of the present invention, corresponding to a cross sectional view of the compact and thin-sized reactor taken from A-A line in FIG. 9.

Next, referring to FIGS. 9 through 11, description will be made about securing structures each for securing a measuring member having a sensor element and a lead elongated from the sensor element to a subject to be measured according to fourth and fifth embodiments of the present invention. In these embodiments, the present invention is applied to a case that a thermistor, as a measuring member, is secured to a compact and thin-sized reactor, as a subject to be measured. FIG. 9 is a perspective view for schematically showing the compact and thin-sized reactor to which the securing structure according to the fourth embodiment of the present invention is applied. FIG. 10 is a view for schematically showing the securing structure according to the fourth embodiment of the present invention, corresponding to a cross sectional view of the compact and thin-sized reactor taken from A-A line in FIG. 9. FIG. 11 is a view for schematically showing a securing structure according to the fifth embodiment of the present invention, corresponding to a cross sectional view of the compact and thin-sized reactor taken from A-A line in FIG. 9.

As illustrated in FIGS. 9 and 10, the reactor 10 is, for example, for use in an automobile and is therefore used in an electric circuit of an apparatus having compulsory cooling means in the automobile. The reactor 10 is made to be compact from the view points of reducing a space for disposing the reactor 10 as an electric part in the automobile, and the like. Further, the reactor 10 is disposed so that a bottom surface of a heat-conductive reactor case 70 may be kept contact with the compulsory cooling means (for example, water-cooling means) in the automobile. Therefore, the reactor 10 is constructed to be a thin-sized reactor so that a bottom area thereof may be large. Namely, the reactor 10 illustrated in FIG. 9 is a more compact and more thin-sized reactor, as a whole, compared with the above-mentioned reactor 10 illustrated in FIG. 1.

As illustrated in FIG. 9, the reactor 10, similarly to that illustrated in FIG. 1, includes a reactor coil 11, bobbins 15*a* and 15*b* having coil distribution portions 14*a* and 14*b* (See FIG. 10) formed integrally with the bobbins 15*a* and 15*b* (See FIG. 1), a reactor core 17, a thermistor 20 (See FIG. 3), the heat-conductive reactor case 70, an unillustrated insulative and heat-radiative sheet, and the like. The reactor 10 of this embodiment is shown in FIG. 9 in a condition that the above reactor parts are contained in the heat-conductive reactor case 70. The reactor coil 11 has a constitution that two single coil elements are formed in parallel. On the other hand, the bobbins 15*a* and 15*b* has flange portions 15*aa*, 15*ba* (See FIG. 1) and two boss portions (not shown in FIG. 9) formed integrally with the flange portions 15*aa*, 15*ba*, respectively. The bobbins 15*a*, 15*b* has a constitution that respective boss portions are disposed to be opposite to each other. Coil elements 11A, 11B of the reactor coil 11 are wound around the two boss portions, respectively. The coil distribution portions 14*a* and 14*b* are disposed between the two boss portions in the bobbins 15*a* and 15*b*, so that the coil distribution portions 14*a*, 14*b* are constructed to be integral with the flange portions 15*aa*, 15*ba*, respectively. The reactor core 17 is formed to be approximately oval when viewed from the above. The reactor core 17 is thereby configured to be capable of being inserted into the reactor coil 11.

Also in the reactor 10, the two boss portions in the bobbins 15*a* and 15*b* are inserted into the two coil elements 11A, 11B of the reactor coil 11 while the coil distribution portions 14*a*, 14*b* are located between the two coil elements 11A and 11B of the reactor coil 11. Further, both ends of the reactor coil 11 are held by the two flange portions 15*aa* and 15*ba* in the bobbins 15*a* and 15*b*. In addition, the reactor core 17 is inserted into the two boss portions in the bobbins 15*a* and 15*b* while the thermistor 20 is secured to the coil distribution portions 14*a* and 14*b*. Then, these parts are contained in the heat-conductive reactor case 70 through the insulative and heat-radiative sheet. Further, filler is flown into the heat-conductive reactor case 70, so that the parts are constructed to be fixed within the heat-conductive reactor case 70. When the reactor 10 is actually used, the reactor 10 is fixed by screws on the compulsory cooling means of the apparatus in the automobile through screw-holes 70*a* disposed in the heat-conductive reactor case 70. With the construction, the coil distribution portions 14*a* and 14*b* as well as the thermistor 20 constitute features of the securing structure of the present invention.

Herein, referring to FIG. 11, description proceed to a securing structure according to the fifth embodiment of the present invention, before the description made about the details of the securing structure of the fourth embodiment thereof.

As illustrated in FIG. 11, the securing structure according to the fifth embodiment is applied to the more thin-sized reactor 10, compared with the above-mentioned reactor 10 illustrated in FIG. 1. As a result, a container section 42 and a contact section 43 in the fifth embodiment are formed more obliquely than those illustrated in FIG. 7. Besides, FIG. 11 is a cross sectional view of the reactor 10 seen from the reverse side, compared with that illustrated in FIG. 7. However, similar portions are designated by like reference numerals.

As illustrated in FIG. 11, an insertion section 41, a container section 42 and a contact section 43 are disposed in coil distribution portions 14*a* and 14*b*. The measuring section 24 (See FIG. 3) is inserted into the container section 42 through the insertion section 41 from the side of the folded end portion 24*a* (See FIG. 8). The measuring section 24 inserted through the insertion section 41 is contained in the container section 42. The head portion of the covered portion (resin tube 23) (See FIG. 3) comes into contact with the contact section 43 and the measuring section 24 is thereby prevented from falling out, when the lead 22 is pulled.

As illustrated in FIG. 11, since the securing structure according to the fifth embodiment is applied to the more thin-sized reactor 10, the container section 42 is set almost horizontally.

The insertion section 41 is formed from a left and upper end portion of the coil distribution portion 14*a* to a substantially center portion thereof. In other words, the left and upper end portion of the coil distribution portion 14*a* is notched to have a notched portion of a triangle shape that forms the insertion section 41. The container section 42 is formed in a right and lower end portion of the coil distribution portion 14*a* and most portions of a lower side of the coil distribution portion 14*b*, as illustrated in FIG. 11. In other words, the coil distribution portion 14*a* is notched to have another notched portion of a triangle shape. Further, the most portions of a lower side of the coil distribution portion 14*b* are also notched to have yet another notched portion of a triangle shape. A portion surrounded by these notched portions forms the container section 42. The contact section 43 is formed obliquely in a left and upper end portion of the coil distribution portion 14*b*. In other words, the left and upper end portion of the coil distribution portion 14*b* is projected to have a projecting portion of a nail shape extending toward the left and obliquely lower direction of sheet of FIG. 11. The projecting portion of a nail shape thereby forms the contact section 43.

Thus, in the securing structure according to the fifth embodiment, the projecting portion of a nail shape is disposed in the bobbins. The thermistor 20 (the measuring section 24) is fitted into the projecting portion of a nail shape by one touch. Thereby, the thermistor 20 (the measuring section 24) can be incorporated (positioned and secured) in the reactor 10.

However, it becomes difficult to set the securing structure according to the fifth embodiment, in a case that a reactor itself becomes compact and thin-sized and a space for disposing a thermistor cannot be obtained sufficiently. The thermistor 20 must be positioned and secured correspondingly on a substantially center position of the reactor coil 11 in order that a temperature of the reactor coil 11 may be measured with a high precision and be controlled to prevent the reactor coil 11 from generating heat. However, the more compact and thin-sized the reactor 10 becomes (the more horizontally the container section 42 is set), the more difficult it becomes to insert the thermistor 20 (the measuring section 24) into the container section 42 within the reactor 10. It therefore becomes difficult to incorporate (attach) the thermistor 20 (the measuring section 24) into the container section 42 within the reactor 10.

Further, if the container section 42 is set almost horizontally, it is not possible to confirm by eyes from the above whether or not the thermistor 20 (the measuring section 24) has been inserted into the container section 42 within the reactor 10 firmly at the time of incorporating the reactor parts into the reactor 10. In addition, it is also not possible to confirm by eyes from the above whether or not the thermistor 20 (the measuring section 24) has been contained in the container section 42 within the reactor 10 at the time of inspecting the fabricated reactor 10 after the incorporating operations of the reactor parts into the reactor 10.

Moreover, the contact section 43 must be formed as the projecting portion of a nail shape extending toward the lower direction, a die for fabricating the bobbins 15*a* and 15*b* including the coil distribution portions 14*a* and 14*b* inevitably becomes complicated. This is because the die requires not only dieing in a normal direction (horizontal direction, namely left or right hand direction of sheet of FIG. 11) but also dieing in an upper or lower direction (vertical direction, namely upper or lower direction of sheet of FIG. 11). This thereby requires a sliding mechanism for sliding the die from the lower side. Consequently, a construction of the die inevitably becomes complicated, as mentioned above. Accordingly, cost for the die is increased, dependent on the complicated construction.

Further, it is slightly difficult to design a size of an inlet of the insertion section 41, a size of a depth of the container section 42, and the like. Particularly, a portion consisting of the insertion section 41 and the contact section 43 from which the thermistor 20 (the measuring section 24) is inserted must be designed to have the most optimized sizes thereof, one in order to readily inserting the thermistor 20 (the measuring section 24), the other in order to prevent the thermistor 20 (the measuring section 24) from falling out. Consequently, number of processes of design is also increased.

Under the circumstances, the inventors of the present invention have studied various securing structures capable of stable incorporating operations, of reducing the cost for the die, and of reducing the number of processes of design, even if the reactor itself is made compact and thin-sized and thereby the space for disposing the thermistor cannot be obtained sufficiently. Consequently, the inventors of the present invention have invented a securing structure according to the fourth embodiment of the present invention having bobbin configuration illustrated in FIG. 10. Besides, in this embodiment, the thermistor 20 as a measuring member secured to the coil distribution portions 14*a* and 14*b* of the bobbins as a subject to be measured is similar to that illustrated in FIG. 3.

Now, referring to FIG. 10 with reference to FIG. 3 continued, detailed description will be made about the securing structure for securing a sensor element having a lead according to the fourth embodiment of the present invention.

As illustrated in FIGS. 3 and 10, the securing structure for securing a measuring member (the thermistor 20) having a sensor element (the thermistor element 21) and a lead 22 elongated from the sensor element to a subject (the coil distribution portions 14*a* and 14*b* of the bobbins) according to the fourth embodiment comprises the measuring member including a measuring section 24 having a covered portion in which a part 22*a* of the lead 22 elongated from the sensor element (the thermistor element 21) and having a predetermined length is covered by a material (the resin tube 23) having a rigidity larger than that of the lead 22, the covered portion being folded toward the side of the lead 22 elongated from the covered portion to produce a folded end portion 24*a*, and the subject (the coil distribution portions 14*a* and 14*b* of the bobbins) being constituted by at least first (the coil distribution portion 14*a*) and second (the coil distribution portion 14*b*) members, the first and second members (the coil distribution portions 14*a* and 14*b*) forming an insertion section 410 through which the measuring section 24 is inserted from the side of the folded end portion 24*a*, a container section 420 which contains the measuring section 24 inserted through the insertion section 410, and a falling out-preventing section 430 with which the head portion of the covered portion comes into contact and by which the measuring section 24 is prevented from falling out, when the lead 22 is pulled, and the container section 420 being configured by a space 500 formed obliquely between the first (the coil distribution portion 14*a*) and the second (the coil distribution portion 14*b*) members while the falling out-preventing section 430 being configured in one (the coil distribution portion 14*a*) of the first and the second members positioned below the space 500. Further, the falling out-preventing section 430 is constituted by a hall-shaped hook portion into which the head portion 23*a* of the covered portion enters and with which the head portion 23*a* of the covered portion comes into contact. Furthermore, the hall-shaped hook portion (430) is formed below and near the insertion section 410.

Namely, as illustrated in FIG. 10, in the securing structure according to the fourth embodiment, the coil distribution portions 14*a* and 14*b* of the bobbins as the subjects are constituted by the coil distribution portion 14*a* as the first member and the coil distribution portion 14*b* as the second member. Further, the container section 420 is configured by the space 500 formed obliquely between the coil distribution portion 14*a* as the first member and the coil distribution portion 14*b* as the second member. In addition, the falling out-preventing section 430 is configured in the coil distribution portion 14*a* (the first member) positioned below the space 500. Further, the falling out-preventing section 430 is constituted by the hall-shaped hook portion into which the head portion 23*a* of the covered portion enters and with which the head portion 23*a* of the covered portion comes into contact. Furthermore, the hall-shaped hook portion (430) is formed below and near the insertion section 410.

The securing structure according to the fourth embodiment will be described more in detail with reference to FIG. 10. The insertion section 410 and the container section 420 are disposed between the coil distribution portion 14*a* and the coil distribution portion 14*b*. The container section 420 is configured by the space 500 formed obliquely between the coil distribution portions 14*a* and 14*b*. Herein, the hall-shaped hook portion (430) as the falling out-preventing section 430 is disposed in the coil lo distribution portion 14*a* positioned below the space 500, different from the contact section 43 illustrated in FIG. 11 in the securing structure of the fourth embodiment. With the structure, the measuring section 24 similar to that of FIG. 11 is inserted into the container section 420 through the insertion section 410 from the side of the folded end portion 24*a*. The measuring section 24 inserted through the insertion section 410 is contained in the container section 420. Herein, in the securing structure according to the fourth embodiment, the falling out-preventing section 430 is constituted by the hall-shaped hook portion which not only comes into contact with the head portion 23*a* of the covered portion (resin tube 23) when the lead 22 is pulled but also catches and holds (squeezes) the head portion 23*a* of the covered portion (resin tube 23) at least both from the upper and lower side to hook and stop the head portion 23*a* of the covered portion (resin tube 23). With the structure, when the lead 22 is pulled, the head portion 23*a* of the covered portion (resin tube 23) is guided by an inclined plane of the coil distribution portion 14*a* to climb the inclined plane, so that the head portion 23*a* of the covered portion (resin tube 23) is inserted and fitted into a hole of the hall-shaped hook portion 430. Thereby, the hall-shaped hook portion 430 prevents the measuring section 24 from falling out of the container section 420.

As illustrated in FIG. 10, since the securing structure according to the fourth embodiment is applied to the thin-sized reactor 10, the container section 420 is set almost horizontally. The insertion section 410 is formed between a center end portion of the coil distribution portion 14*a* and a head portion (left end portion of sheet of FIG. 10) of the coil distribution portion 14*b*. In other words, the upper side (upper plane side) of the center end portion of the coil distribution portion 14*a* is notched obliquely while the lower side (lower plane side) of the coil distribution portion 14*b* is notched obliquely. Thereby, the insertion section 410 is formed. As will later be described, the thermistor 20 (the measuring section 24) is inserted into the container section 420 through the insertion section 410 in a condition that the resin tube 23 as the covered portion is directed downward with respect to the lead 22 elongated from the covered portion. At this time, particularly since the upper side (upper plane side) of the center end portion of the coil distribution portion 14*a* is notched obliquely to form the insertion section 410, the head portion 23*a* of the resin tube 23 thus directed downward is guided by an inclined plane of the upper side (upper plane side) of the center end portion of the coil distribution portion 14*a* to slide and inserted into the container section 420. Thus, the securing structure according to the fourth embodiment is capable of readily inserting the thermistor 20 (the measuring section 24) into the container section 420. Further, a right hand portion from the center of the coil distribution portion 14*a* is formed to have a gently inclined plane shape while a round portion (an r) is formed particularly near the hall-shaped hook portion 430. With the structure, the head portion 23*a* of the resin tube 23 can be guided by the round portion (an r) and thereby inserted and fitted into a hole of the hall-shaped hook portion 430 smoothly.

Thus, in the securing structure according to the fourth embodiment illustrated in FIG. 10, it is very easy to set the securing structure in a reactor, even if the reactor itself becomes compact and thin-sized and a space for disposing the thermistor cannot be obtained sufficiently. Further, even if the reactor 10 is compact and thin-sized and the container section 420 formed by the bobbins is set almost horizontally, the thermistor 20 (the measuring section 24) can be readily inserted into the container section 420 within the reactor 10. It is therefore easy to incorporate (attach) the thermistor 20 (the measuring section 24) into the container section 420 within the reactor 10. Further, even if the container section 420 is set almost horizontally, it is possible to confirm by eyes from the above whether or not the thermistor 20 (the measuring section 24) has been inserted into the container section 420 within the reactor 10 firmly at the time of incorporating the reactor parts into the reactor 10.

In addition, it is also possible to confirm by eyes from the above whether or not the thermistor 20 (the measuring section 24) has been contained in the container section 420 within the reactor 10 after the reactor 10 has been assembled as a whole. In other words, the securing structure according to the fourth embodiment is capable of watching the thermistor element after the reactor has been assembled.

Furthermore, in the securing structure according to the fourth embodiment, the thermistor 20 (the measuring section 24) is inserted into the container section 420 through the insertion section 410 in a condition that the resin tube 23 as the covered portion is directed downward with respect to the lead 22 elongated from the covered portion. Further, when the resin tube 23 thus directed downward slides on the inclined plane of the upper side (upper plane side) of the center end portion of the coil distribution portion 14*a* to drop down in the container section 420, a dropping sound "katti" is produced. Therefore, by this dropping sound and also by feeling of hand of an operator who is conducting operation of inserting the thermistor 20 (the measuring section 24), it is possible to confirm that the thermistor 20 (the measuring section 24) has been inserted into the container section 420 within the reactor 10. Besides, in order to enable the operator to readily confirm that the thermistor 20 (the measuring section 24) has been inserted into the container section 420 by the dropping sound "katti" or the feeling of hand, it is desirable that the lead 22 is made of a material having elasticity. Accordingly, when the resin tube 23 of the measuring section 24 inserted into the insertion section 410 with being folded toward the side of the lead 22 by an angle of 180°, namely having a shape like a hair pin, drops down from the inclined plane of the upper side (upper plane side) of the center end portion of the coil distribution portion 14*a*, the measuring section 24 which includes the resin tube 23, the lead 22 elongated from the resin tube 23, and the folded end portion 24*a* and which has a shape like a hair pin becomes opened strongly by the elasticity of the lead 22 around the folded end portion 24*a* as a fulcrum toward the side of a bottom of the container section 420. Consequently, the head portion 23*a* of the resin tube 23 drops down and collides with the above-mentioned round portion (an r) of the coil distribution portion 14*a*, and the like, so that the dropping sound "katti" can be produced without fail.

Thus, in the securing structure according to the fourth embodiment illustrated in FIG. 10, similarly to the operation processes illustrated in FIGS. 6A through 6C, at first, the thermistor element 21 and the part of the lead 22*a* covered by the resin tube 23 is folded toward the side of the lead 22 elongated from the covered portion (the resin tube 23) by an angle of 180° to produce the measuring section 24 including a folded end portion 24*a* having a shape like a hair pin. Then, the measuring section 24 is inserted into the container section 420 through the insertion section 410 in a condition that the resin tube 28 as the covered portion is directed downward with respect to the lead 22 elongated from the covered portion.

Accordingly, the resin tube 23 thus directed downward is guided by the inclined plane of the upper side (upper plane side) of the center end portion of the coil distribution portion 14*a* to slide and inserted into the container section 420. The thermistor 20 (the measuring section 24) can therefore be readily inserted into the container section 420.

Furthermore, in the securing structure according to the fourth embodiment, the thermistor 20 (the measuring section 24) is inserted into the container section 420 through the insertion section 410 in a condition that the resin tube 23 as the covered portion is directed downward with respect to the lead 22 elongated from the covered portion. Further, when the resin tube 23 thus directed downward slides on the inclined plane of the upper side (upper plane side) of the center end portion of the coil distribution portion 14*a* to drop down in the container section 420, the dropping sound "katti" is produced. Therefore, by this dropping sound and also by feeling of hand of an operator who is conducting operation of inserting the thermistor 20 (the measuring section 24), it is possible to confirm that the thermistor 20 (the measuring section 24) has been inserted into the container section 420 within the reactor 10.

After confirming that the thermistor 20 (the measuring section 24) has been inserted into the container section 420, then, by pulling the side of the other end of the lead 22 toward the left and upper side of the reactor 10, the head portion 23*a* of the resin tube 23 is returned in the pulling direction to be hooked and stopped by the hall-shaped hook portion 430. At this time, the head portion 23*a* of the resin tube 23 can be guided by the round portion (an r) formed particularly near the hall-shaped hook portion 430 and thereby inserted and fitted into the hole of the hall-shaped hook portion 430 smoothly. Accordingly, the thermistor 20 can be positioned and secured correspondingly on a substantially center position of the reactor coil 11 with a high precision, so that a temperature of the reactor coil 11 can be measured and be controlled to prevent the reactor coil 11 from generating heat. In addition, the measuring section 24 can be contained in the container section 420 without fail. Further, the measuring section 24 can be prevented from falling out without fail.

Moreover, in the securing structure according to the fourth embodiment, as illustrated in FIG. 10, the container section 420 and the hall-shaped hook portion 430 can be formed at the same time by notching the right end side, the left end side of the coil distribution portions 14*a*, 14*b*, respectively. In other words, it is not necessary that the contact section is formed as the projecting portion of a nail shape extending toward the lower direction, different from the securing structure illustrated in FIG. 11. A die for fabricating the bobbins 15*a* and 15*b* including the coil distribution portions 14*a* and 14*b* does not become complicated in the fourth embodiment. This is because the die requires only dieing in a normal direction (horizontal direction, namely left or right hand direction of sheet of FIG. 10). In other words, the die for this embodiment never require dieing in an upper or lower direction (vertical direction, namely upper or lower direction of sheet of FIG. 10). This thereby requires no sliding mechanism for sliding the die from the lower side. Consequently, a construction of the die never become complicated. Accordingly, cost for the die is not increased, dependent thereon.

Further, by the hall shaped hook portion 430 not only the thermistor 20 can be positioned and secured correspondingly on a substantially center position of the reactor coil 11 with a high precision but also the measuring section 24 can be contained in the container section 420 without fail. It is therefore not difficult to design the size of an inlet of the insertion section 410, the size of a depth of the container section 420, and the like. Consequently, number of processes of design is not increased.

Thus, the securing structure according to the fourth embodiment of the present invention becomes capable of stable incorporating operations, of reducing the cost for the die, and of reducing the number of processes of design, even if the reactor itself is made compact and thin-sized and thereby the space for disposing the thermistor cannot be obtained sufficiently.

While this invention has thus far been described in conjunction with only several embodiments thereof, it would be readily possible for those skilled in the art to put this invention into various other manners within the scope of the claims of this invention. For example, in the above embodiments, the present invention is applied to the securing structures that a thermistor, as a measuring member, is secured to a reactor, as a subject to be measured. However, the present invention is not restricted to the securing structures. The present invention can be widely applied to the other securing structures that the other sensor elements, such as a magnetic element, and the like, as a measuring member, is secured to the other electric components, such as a transformer, and the like, as a subject.

What is claimed:

1. A securing structure for securing a measuring member having a sensor element and a lead elongated from said sensor element to a subject to be measured, said securing structure comprising:

said measuring member including a measuring section having a covered portion in which a part of said lead elongated from said sensor element and having a predetermined length is covered by a material having a rigidity larger than that of said lead, said covered portion being folded toward the side of said lead elongated from said covered portion to produce a folded end portion; and said subject to be measured having an insertion section through which said measuring section is inserted from the side of said folded end portion, a container section which contains said measuring section inserted through said insertion section, and a contact section with which said head portion of said covered portion comes into contact and by which said measuring section is prevented from falling out, when said lead is pulled.

2. A securing structure as claimed in claim 1, wherein said contact section is formed in said insertion section.

3. A securing structure as claimed in claim 1, wherein a size of an inlet of each of said insertion section and said container section is formed to be approximately the same as a size of said measuring section in the direction perpendicular to an axis thereof

4. A securing structure as claimed in claim 1, wherein a depth of said container section is formed to be approximately the same as a size of said measuring section in an axial direction thereof.

5. A securing structure as claimed in claim 1, wherein a size of said measuring section in an axial direction thereof is formed to be larger than that of said measuring section in the direction perpendicular to an axis thereof.

6. A securing structure as claimed in claim 1, wherein said lead is made of a material having elasticity.

7. A securing unit which is secured to a subject to be measured, said securing unit comprising:

a measuring member having a sensor element and a lead elongated from said sensor element;

a housing member having an insertion section through which said sensor element and said lead are inserted, a container section which contains said sensor element and said lead inserted through said insertion section, and a contact section with which said sensor element and said lead comes into contact and by which said sensor element and said lead are prevented from falling out, when said lead is pulled; and said measuring member being fixed within said housing member.

8. A securing structure for securing a measuring member having a sensor element and a lead elongated from said sensor element to a subject to be measured, said securing structure comprising:

said measuring member including a measuring section having a covered portion in which a part of said lead elongated from said sensor element and having a predetermined length is covered by a material having a rigidity larger than that of said lead, said covered portion being folded toward the side of said lead elongated from said covered portion to produce a folded end portion; and said subject to be measured being constituted by at least first and second members, said first and second members forming an insertion section through which said measuring section is inserted from the side of said folded end portion, a container section which contains said measuring section inserted through said insertion section, and a falling out-preventing section with which said head portion of said covered portion comes into contact and by which said measuring section is prevented from falling out, when said lead is pulled; and said container section being configured by a space formed obliquely between said first and said second members while said falling out-preventing section being configured in one of said first and said second members positioned below said space.

9. A securing structure as claimed in claim 8, wherein said measuring member is inserted into said container section through said insertion section in a condition that said covered portion is directed downward with respect to said lead elongated from said covered portion.

10. A securing structure as claimed in claim 8, wherein said falling out-preventing section is constituted by a hall-shaped hook portion into which said head portion of said covered portion enters and with which said head portion of said covered portion comes into contact.

11. A securing structure as claimed in claim 8, wherein said hall-shaped hook portion is formed below and near said insertion section.

12. A securing structure as claimed in claim 8, wherein said lead is made of a material having elasticity.

* * * * *